US005135036A

United States Patent [19]

Caron

[11] Patent Number: 5,135,036

[45] Date of Patent: Aug. 4, 1992

[54] VERSATILE CLAMPING BENCH

[76] Inventor: Eugene J. Caron, 10724 Pinto Dr., Hudson, Fla. 34669

[21] Appl. No.: 775,164

[22] Filed: Oct. 11, 1991

[51] Int. Cl.[5] .......................... B25H 1/00; B23Q 3/00

[52] U.S. Cl. ............................ 144/286 A; 144/286 R; 269/16; 269/41; 269/93; 269/139; 269/221; 269/305

[58] Field of Search ........................ 269/16, 41, 88, 91, 269/93, 139, 221, 231, 242, 293, 294, 295, 289 R, 305; 144/1 R, 286 R, 286 A, 287, 285

[56] References Cited

U.S. PATENT DOCUMENTS

| | | | |
|---|---|---|---|
| 1,262,781 | 4/1918 | Gross | 269/221 |
| 3,024,521 | 3/1962 | Polk | 269/221 |
| 3,540,128 | 11/1970 | Giles | 269/308 |
| 3,608,886 | 9/1971 | Greene | 269/305 |
| 3,926,419 | 12/1975 | Kenny | 269/16 |
| 4,027,866 | 6/1977 | Ruggiero | 269/41 |
| 4,579,322 | 4/1986 | Schwarz | 269/221 |
| 4,757,849 | 7/1988 | Morris | 269/139 |
| 4,909,491 | 3/1990 | Cheng | 269/16 |

FOREIGN PATENT DOCUMENTS

| | | | |
|---|---|---|---|
| 2561970 | 10/1985 | France | 269/246 |

*Primary Examiner*—W. Donald Bray

*Attorney, Agent, or Firm*—Joseph C. Mason, Jr.; Ronald E. Smith

[57] ABSTRACT

A versatile work bench. Throughbores are formed in the bench top and a captive nut is positioned in a countersink associated with each throughbore on the bottom surface of the bench top. Clamping boards are similarly provided with throughbores and captive nuts positioned in countersinks. Clamping tools that include a hand-rotatable handle and a screw that rotates in response to rotation of the handle may be employed to clamp workpieces between the bench top and the clamping boards. Clamping wedges that also include a throughbore and a captive nut may be tightened by clamping tools to wedge together workpieces disposed in edge-to-edge relation to one another. Turnbuckles and straps may be used to interconnect the bench top and clamping boards when large workpieces are to held atop the bench top. Large flat items may be held on their edge on the bench top by a mounting block and an arrangement of turnbuckles and straps. Router guides, templates, drawing boards, cantilevered drill bit holders, and other useful structures are also provided.

14 Claims, 8 Drawing Sheets

Fig. 1
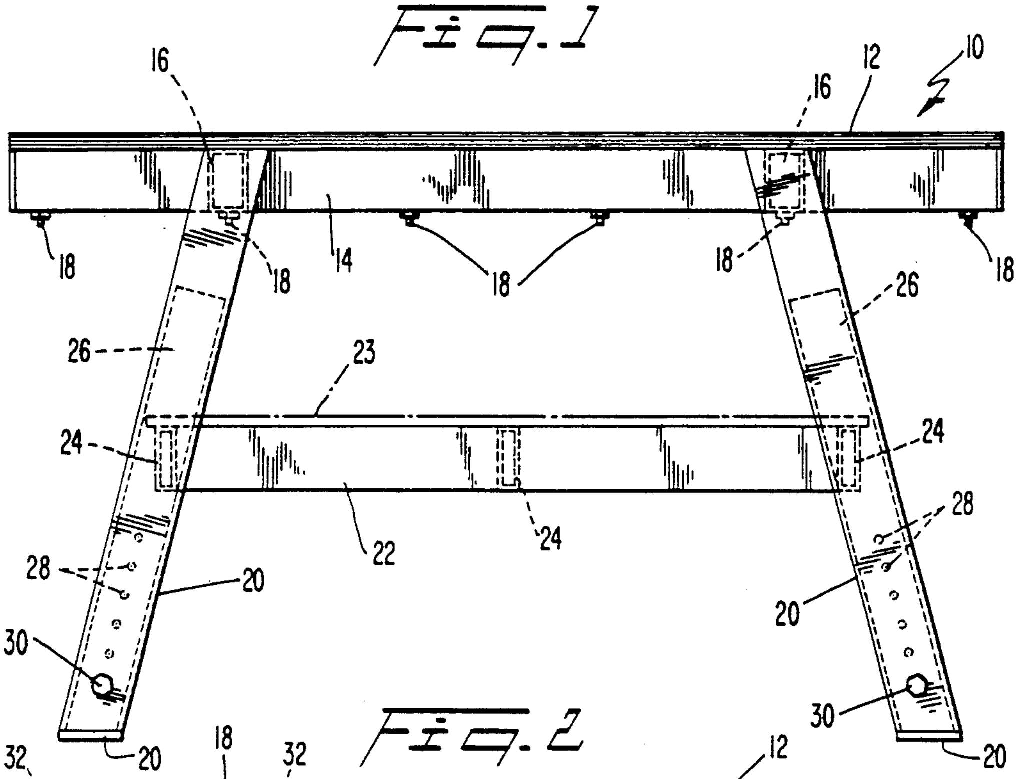
Fig. 2
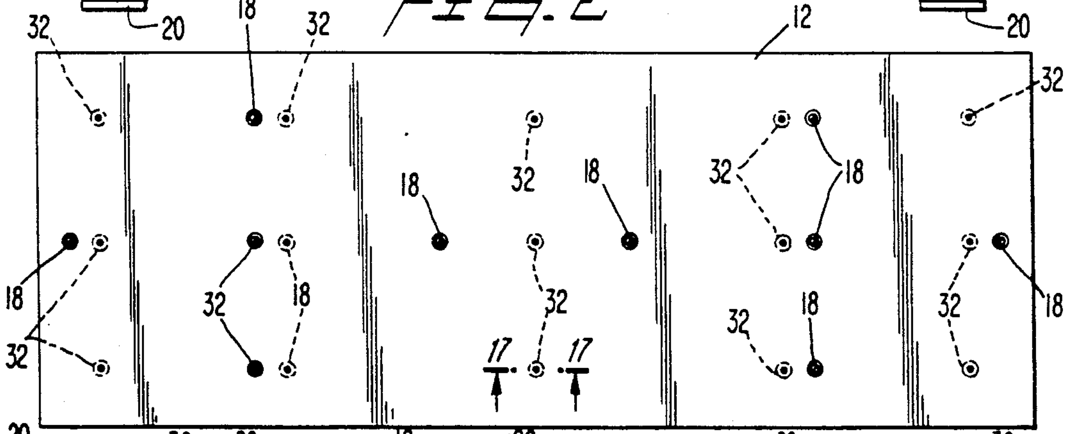
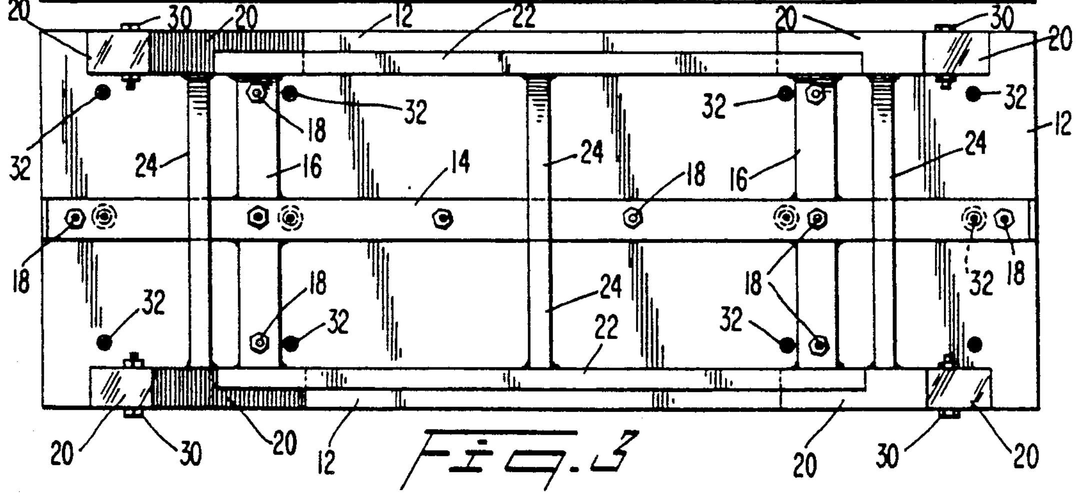
Fig. 3

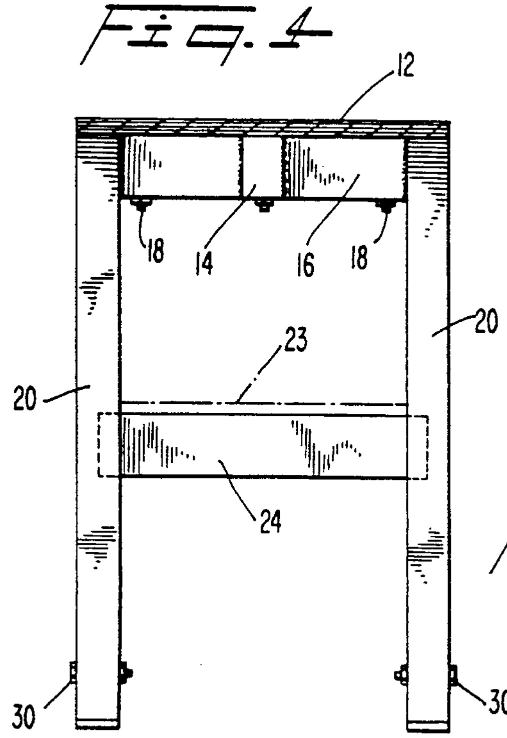
Fig. 4
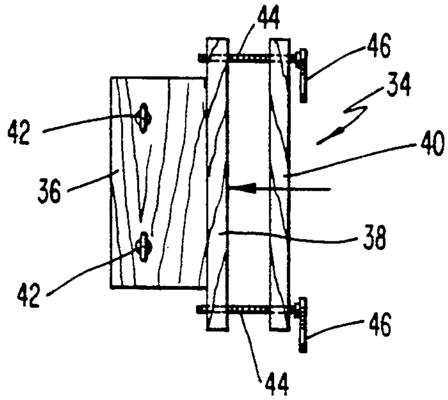
Fig. 5
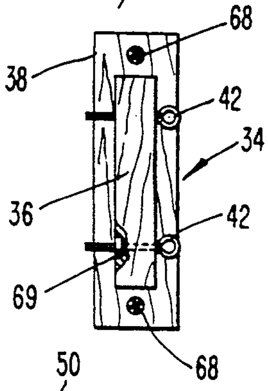
Fig. 6
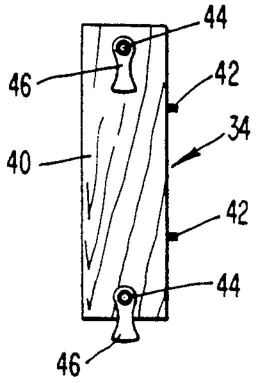
Fig. 7
Fig. 9
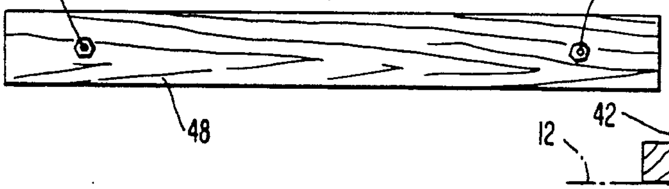
Fig. 8
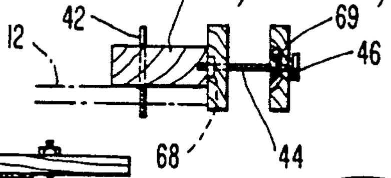
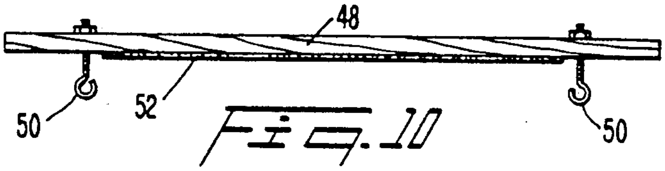
Fig. 10
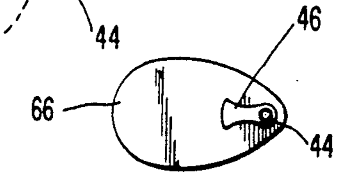
Fig. 12
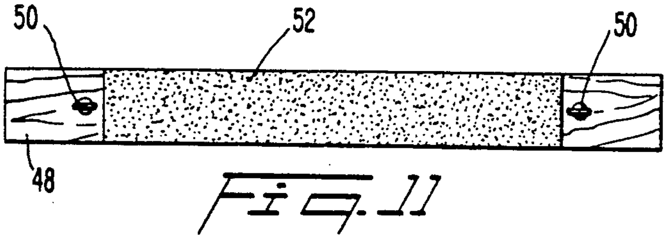
Fig. 11
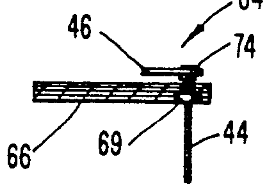
Fig. 13

Fig. 15
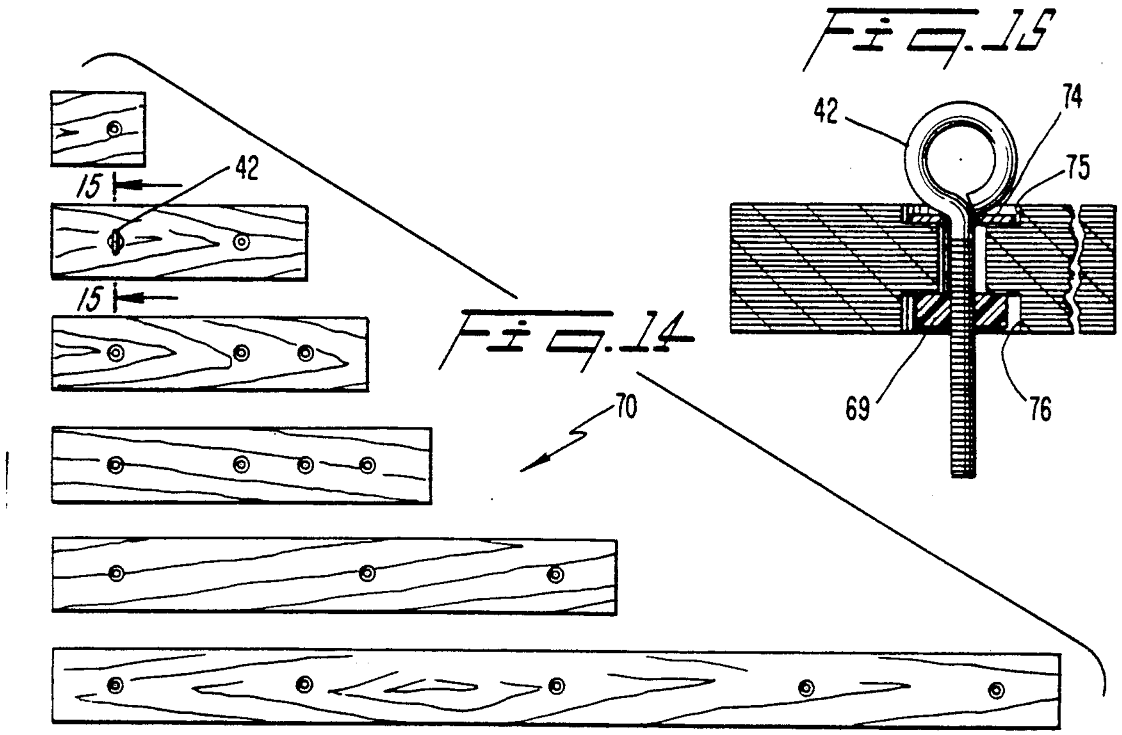
Fig. 14
Fig. 16
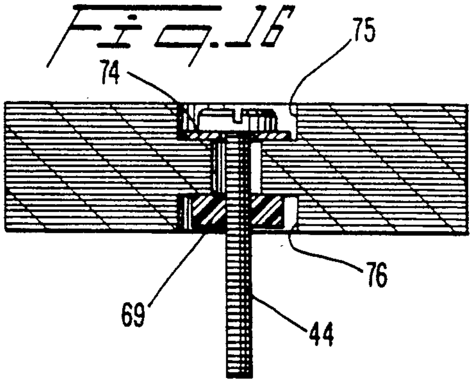
Fig. 17
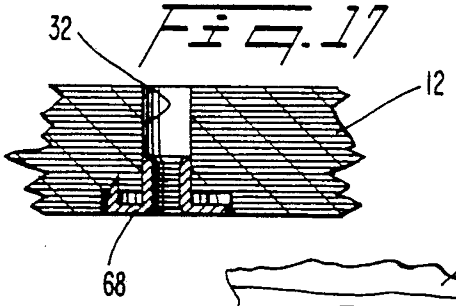
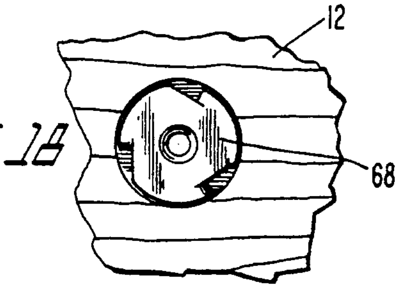
Fig. 18
Fig. 19
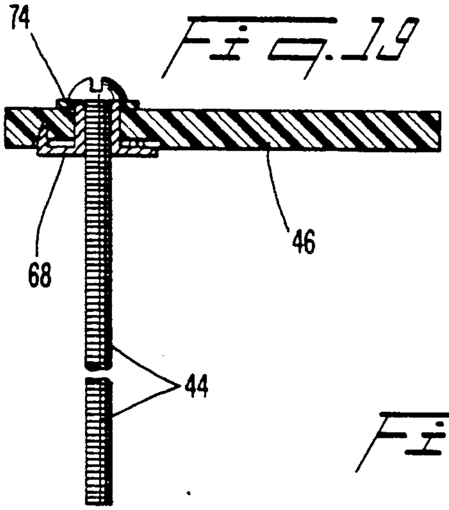
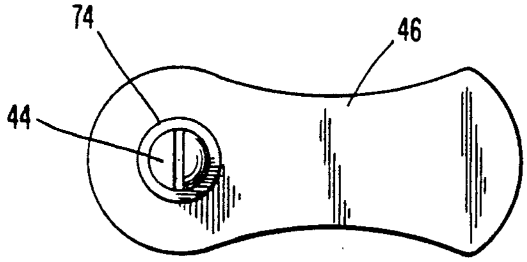
Fig. 20

Fig. 21
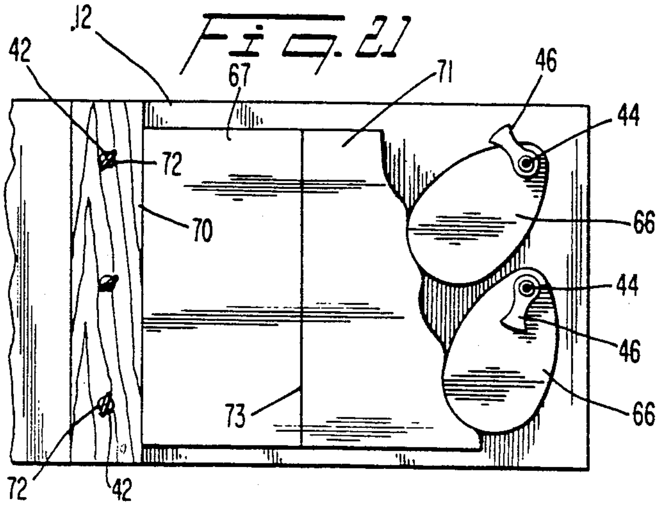
Fig. 22
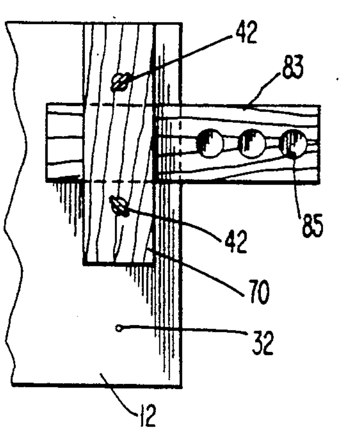
Fig. 23
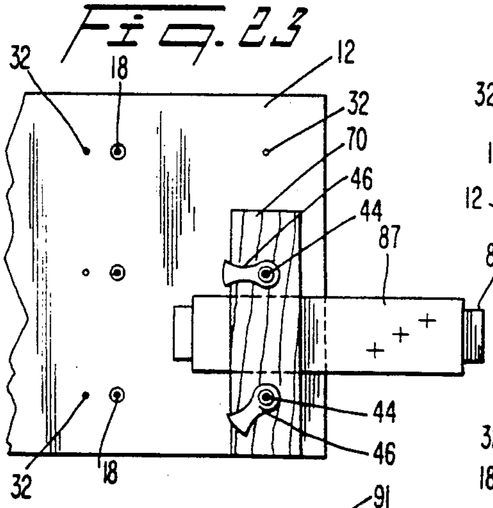
Fig. 24
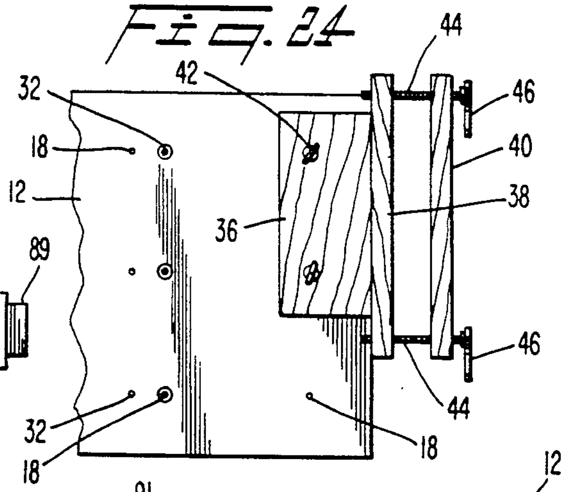
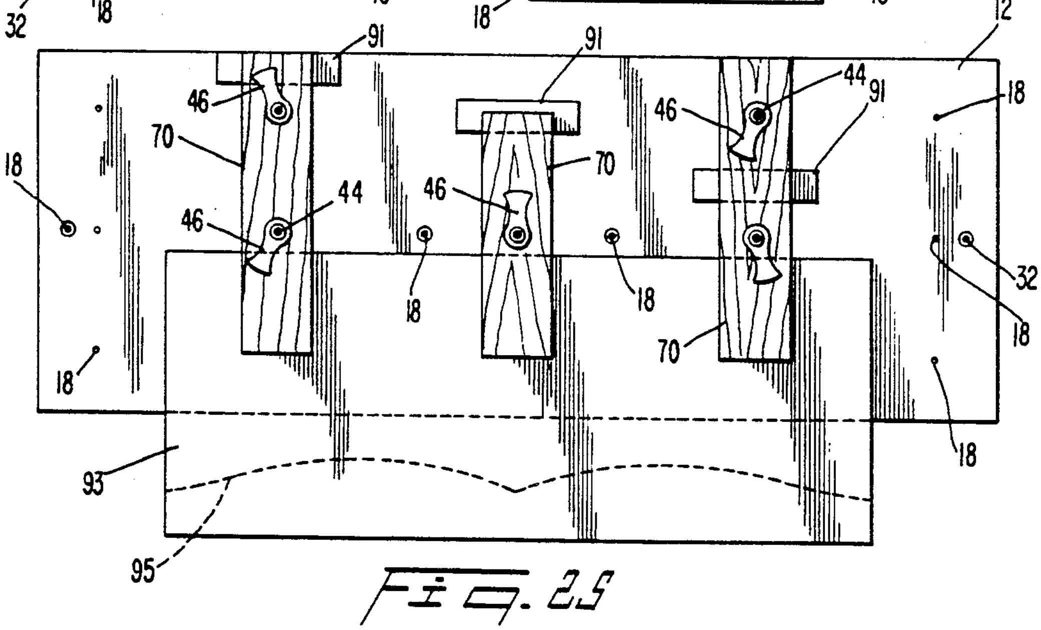
Fig. 25

Fig. 26
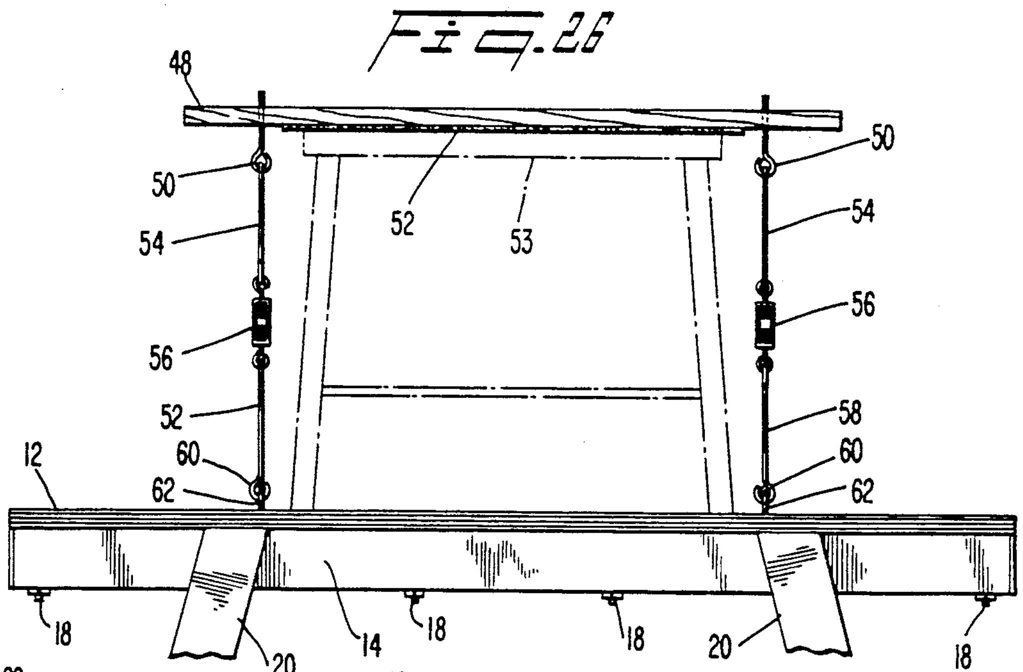
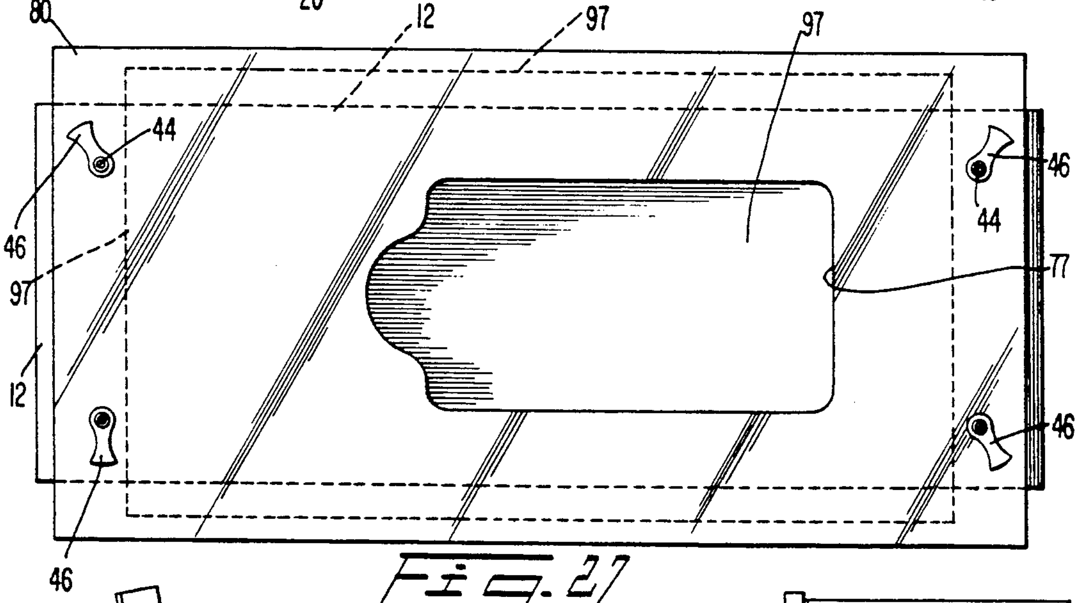
Fig. 27
Fig. 28
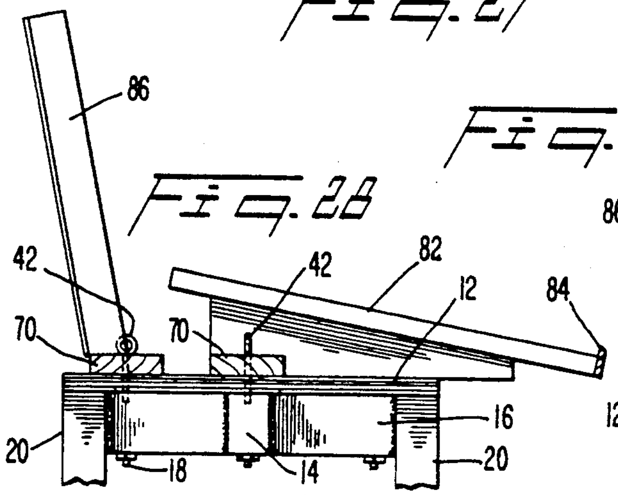
Fig. 29
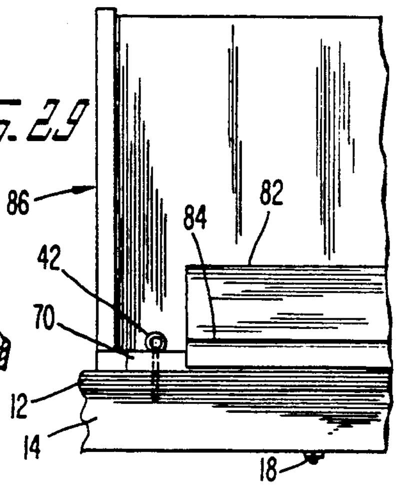

VERSATILE CLAMPING BENCH

TECHNICAL FIELD

This invention relates, generally, to work benches. More particularly, it relates to a work bench and related clamps for holding very small to very large articles during a wood working operation.

BACKGROUND ART

Many work benches have been designed to assist the professional or hobbyist in the wood working arts. Benches that transform into sawhorses, benches having general purpose clamping means, and many different special purpose benches are well known.

French patent 2,561,970 shows a bench having a plurality of holes formed in the top thereof for receiving screws positioned on opposite ends of boards; an article to be held is placed into overlying relation to the bench top, a board of the type just described is placed into overlying relation to said article, and the screws are advanced into the bench top holes to sandwich the article between the bench top and the board.

The French bench thus enables facile clamping of articles, but its construction does not permit a wide variety of wood working operations to take place. For example, routing requires that the article being routed be held in spaced relation above the bench top. The French design includes no means for tightly clamping an article above the bench top; more importantly, the French design includes no teachings or suggestions as to how an article could be held above the plane of the bench top.

The prior art, when considered as a whole in accordance with the requirements of law, neither teaches nor suggests to those of ordinary skill in this art how the French design could be improved.

DISCLOSURE OF INVENTION

A bench top has a plurality of holes or throughbores formed therein and a countersink is formed on the bottom side of each hole. A captive nut having a thickness no greater than the depth of the countersink is fully received within each countersink so that said nut lies substantially flush with the bottom side of the bench top. The shape of the nut prevents it from turning.

A plurality of clamping boards of differing lengths are also provided. Each clamping board has a plurality of throughbores formed therein; one or both ends of each throughbore may be countersunk.

A clamping tool having an elongate, dog bone or other flat shape that may by comfortably gripped by a human hand may be employed in conjunction with a clamping board or boards. Each clamping tool has a throughbore formed in a first end thereof for receiving an elongate screw member having a head that is fixedly secured against rotation relative to the clamping tool by a captive nut and by an epoxy or other suitable adhesive means so that rotation of the clamping tool about the longitudinal axis of the screw effects simultaneous and corresponding rotation of the screw about said axis, thereby enabling the user to easily tighten the clamping tool. The screw secured to the clamping tool is inserted through a throughbore formed in a clamping board and through a throughbore formed in the bench top. An article to be held against movement is sandwiched between the bench top and the clamping board and the clamping tool is manually rotated about the longitudinal axis of the screw to tighten the clamping board to the extent desired.

An alternate method is to employ a flat head screw and washer in lieu of said tool where desired to keep the top of the clamping board free of protrusions, as in routing. Another alternate is to use an eyebolt screw where it is desired to fasten a turnbuckle for overhead clamping. In cases involving clamping of accessories where the clamping board is an integral part of the auxiliary unit, the screw can be held captive by use of a neoprene or plastic nut recessed into the counterbore of the clamping board. With both ends of throughbores in clamping boards countersunk, the user has a plurality of clamping choices at his disposal.

Because of the clamping surface areas involved, only a slight hand tightening of the clamping tool is required to hold a workpiece securely for sawing and routing operations.

Where a large workpiece is to be held against movement, a clamping board that overlies the workpiece may be joined to the bench top by eyebolts and turnbuckles.

Articles can be held in a vertical plane by an auxiliary clamping device that includes a mounting board that lies in the same plane as the horizontal plane of the bench top and which clamps to the bench top. An immobile base board lies in a plane orthogonal to the plane of the bench top and is joined to a clamping board by the novel clamping tool described above.

Edge to edge clamping and glueing is accomplished by positioning a clamping board in abutting overlying relation to the top of the bench on the outer end of a first workpiece and one or more of a novel clamping wedge in abutting overlying relation to the top of the bench on the outer end of a second workpiece to be glued thereto. Rotation of the clamping wedges thus provides a cam action that drives the two workpieces toward one another to provide the pressure needed for the adhesive to work; the novel clamping tool may be used advantageously to tighten the clamping wedges.

It should therefore be clear that the primary purpose of the present invention is to advance the art of wood working benches by providing a bench having increased versatility over the benches heretofore known.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a front elevational view of the novel bench;

FIG. 2 is a top plan view thereof;

FIG. 3 is a bottom plan view thereof;

FIG. 4 is an end elevational view thereof;

FIG. 5 is a top plan view of a novel vise member which is attachable to the novel bench;

FIG. 6 is a side elevational view of said vise member, as viewed from the left side of FIG. 5;

FIG. 7 is a side elevational view of said vise member, as viewed from the right side of FIG. 5;

FIG. 8 is a front elevational view of said vise member, with the bench top to which it is attached shown in phantom lines;

FIG. 9 is a top plan view of one embodiment of a novel clamping board;

FIG. 10 is a front elevational view of said clamping board;

FIG. 11 is a bottom plan view of said clamping board;

FIG. 12 is a top plan view of the novel clamping tool assembled to a clamping wedge;

FIG. 13 is a side elevational view of said clamping assembly;

FIG. 14 is a top plan view of a family of clamping boards;

FIG. 15 is a sectional view taken along line 15—15 in FIG. 14;

FIG. 16 is a sectional view similar to FIG. 15, but showing an alternate embodiment of the captive fastening member;

FIG. 17 is a sectional view showing an embodiment of a captive nut in the bench and auxiliary vise;

FIG. 18 is a plan view of the captive nut shown in FIG. 17;

FIG. 19 is a sectional view of the clamping tool;

FIG. 20 is a top plan view of the clamping tool;

FIG. 21 is a top plan view of a clamping wedge assembly for holding together a pair of articles being glued together;

FIG. 22 is a top plan view of a novel holder for glue, paint, or other bottles;

FIG. 23 is a top plan view of a cantilevered-supported stock prepared for drilling;

FIG. 24 is a top plan view of the vise shown in FIG. 5 attached to the novel table;

FIG. 25 is a top plan view of the novel table when holding a large stock to be worked;

FIG. 26 is a partial front elevational view of the table being used to hold a large item thereatop;

FIG. 27 is a top plan view of the table being used to hold a template;

FIG. 28 is a side elevational view of the table being used to hold a drafting board and a paper holder;

FIG. 29 is a partial front elevational view of the structure shown in FIG. 28;

Similar reference numerals refer to similar parts throughout the several views of the drawings.

BEST MODES FOR CARRYING OUT THE INVENTION

Figure 30:
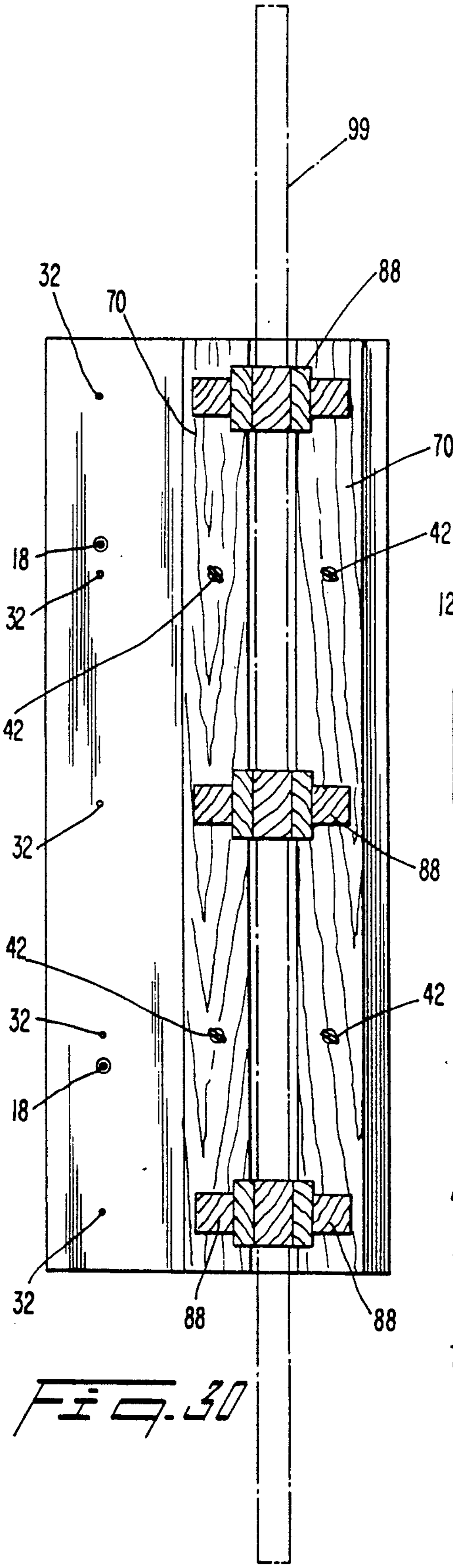
FIG. 30 is a top plan view showing a large object such as a door, in phantom lines, being held on an edge atop the novel bench.

The first four figures show the preferred construction of the novel table. Table 10 includes a flat bench top 12 braced by a plurality of longitudinally extending boards, collectively denoted 14, and a pair of transversely disposed boards 16; boards 14 and 16 are secured to bench top 12 by a plurality of bolts, collectively denoted 18.

The bench top 12 is supported by four leg members, collectively denoted 20; the legs 20 are braced by longitudinally extending brace members 22 and transversely extending brace members 24. Each leg 20 is hollow and slidably receives therein a telescoping leg member 26. Plural apertures 28 are formed in each outer leg 20 and in each inner leg 26; a pin 30 is selectively insertable through aligned pairs of said apertures to hold the legs 20 and 26 in differing levels of telescopic adjustment so that the bench top 12 can be adjusted to differing heights for the comfort of individual wood workers of differing heights. As depicted in FIG. 1, the bench top is positioned in its lowest configuration and pin 30 is inserted into the lowermost aperture so that the inner legs 26 cannot be extended. To raise the height of the bench top, pins 30 are removed, legs 26 are extended until the desired bench top height is achieved, and pins 30 are inserted into the lowermost of the aligned holes.

An imperforate support surface 23 is also advantageously provided at the level of the brace members 22 and 24; this provides storage space for miscellaneous tools and supplies or may be put to other advantageous usages.

Plural throughbores, collectively denoted 32, are formed in bench top 12 and are shown in FIG. 2. A countersink is formed in each throughbore 32, as depicted in FIG. 17, and a captive nut 68 is positioned in each countersink, in flush relation to the bottom surface of bench top 12. These bench top throughbores 32 and their associated captive nuts enable the attachment of as many auxiliary items to the bench top as can be imagined; only a representative sample of the auxiliary items will be shown and described to avoid unduly lengthening this disclosure.

A first auxiliary item is a vise means that enables the worker to hold stock to be worked in a vertical plane; the vise means is shown in FIGS. 5-8 and 24. Vise 34 includes a mounting plate 36 having throughbores formed therein, base plate 38 having throughbores formed therein, clamping plate 40 having throughbores formed therein, eyebolts 42 for securing the mounting plates 36 to the respective top and bottom surfaces of bench top 12 as best understood in connection with FIGS. 8 and 24, elongate screws 44 for screw threadedly interengaging base plate 38 and clamping plate 40, and clamping tools 46. Tools 46 and screws 44 are fixedly secured to one another for conjoint rotation; thus, rotation of a clamping tool 46 imparts a simultaneous and corresponding rotation to its associated screw 44, and the clamping plate 40 is advanced toward or retracted from base plate 38 depending upon the direction of rotation.

FIGS. 9-11 and 26 show a special clamping board and an apparatus for holding down a large item such as a stool atop bench top 12. Board 48 has throughbores formed in its opposite ends for receiving eyebolts 50 and conventional hex nuts. A strip of felt 52 or other suitable pad means is adhered to the underside of board 48 so that an item, such as stool 53 (FIG. 26), is not marred by board 48 when said stool is being worked upon. A suitable strap 54 connects each eyebolt 50 to a turnbuckle 56. Each turnbuckle 56 is connected by a suitable rod 58 terminating in eyebolt 60 that engages eyebolt 60 that is screw threadedly engaged in an associated bench top throughbore 32. Thus, the tension in straps 54 and 58 and hence the hold-down force applied to stool 53 is easily adjusted by turning each turnbuckle 56 about its axis of rotation.

Clamping wedge 64, shown in FIGS. 12 and 13, may be used as depicted in FIG. 21. It includes a flat, pear-shaped wedge base 66, clamping tool 46, and screw member 44. A captive nut 69 is positioned in a countersunk opening in the bottom of wedge base 66 as depicted in FIG. 13; this captive nut lies within the counterbore of the wedge base 66. The clamp assembly imparts longitudinal displacement to screw 44 as it is rotated by clamping tool 46, said-displacement direction being dependent upon the direction of rotation.

A couple of pieces of stock to be glued together are shown in FIG. 21 and denoted 67 and 71; adhesive has been applied to the edges of said stock along abutting line 73 and the novel bench and auxiliary items are employed to press the stock 67 and 71 together during the time the adhesive is curing. A clamping board 70 is placed into overlying relation to bench top 12 and plural eyebolts 42 are inserted through bores 72 formed in said clamping board; each eyebolt is screw threadedly engaged by a captive nut 68 that is positioned in a countersink formed in the bottom surface of the bench top (see FIG. 17) so that advancing each eyebolt 42 causes clamping board 70 to bear down tightly against bench top 12, thereby providing a backing for stock 67.

Clamping wedges 66 are then rotated clockwise into the position depicted in FIG. 21 and clamping tools 46 are used to tighten screws 44; this rotation is also clockwise so that when the screws 44 are being tightened, the clamping wedges 66 are further urged in a clockwise direction against stock 71. When the adhesive is set, the clamping tools 46 are rotated in a counterclockwise direction to loosen clamping wedges 66 and said wedges are then rotated in a counterclockwise direction to release the pressure against stock 71.

A family of said clamping boards is pictured in FIG. 14; all of them are collectively denoted 70 since they differ only in length and number of throughbores 72. As already indicated in connection with FIG. 21, there are numerous uses for clamping boards 70. The throughbores 72 formed therein are aligned with the throughbores 32 formed in bench top 12 and the eyebolts 42 are extended therethrough to secure said boards to said bench top in many of the configurations made available by this invention.

It should be understood that a captive nut such as nut 68 shown in FIG. 17 is also associated with each throughbore 32 formed in bench top 12. For example, in the embodiment of the bench top 12 depicted in FIG. 2, there are fifteen throughbores 32 and, accordingly, fifteen captive nuts 68. Each nut is held against rotation on the bottom surface of the bench top by countersunk cavity 76.

Clamping boards 70 may also be held down with flat headed screws 44 such as depicted in FIG. 16. This facilitates free-hand routing on a clamped piece of stock with no obstructions to arm movement.

FIGS. 17 and 18 show the captive nut 68 used in the bench top. The captive nuts 69 shown in FIGS. 15 and 16 are not alternates to said nut 68, i.e., they are plastic or neoprene nuts to make the screw captive.

FIGS. 19 and 20 show clamping tool 46 in more detail. Washer 74 performs the well-known function of washers; note that captive nut 68 is used in the preferred embodiment of the tool.

FIG. 22 shows a cantilevered board 83, having apertures 85 formed therein, that is held down by a clamping board 70; board 70 bridges board 83 and suitable fastening means such as eyebolts 42 are positioned through throughbores 72 and associated captive nuts, formed in the clamping board and through the throughbores 32, and associated captive nuts, formed in the bench top. Tightening the fastening means thus sandwiches board 83 and holds it against movement. Openings 85 may be used to hold glue, paint, or other bottles.

Instead of the fastening means 42 shown in FIG. 22, clamping tools 46 may be used to hold down a board in cantilevered relation to the edge of bench top 12; such use of said clamping tools 46 is depicted in FIG. 23. Stock 87 is to be drilled or otherwise worked; accordingly, a brace 89 is positioned below it for support.

A very large item may be worked when the novel bench and its auxiliary parts are configured in the manner depicted in FIG. 25. A large work stock 93 to be cut along line 95 may be held in cantilevered relation to the leading edge of bench top 12 by plural transversely disposed clamping boards 70 that are disposed in parallel relation to one another in equidistant and longitudinally spaced relation to one another. Clamping boards of differing lengths may be employed, as exemplified in said FIG. 25. Brace boards, collectively denoted 91, are positioned at preselected locations to support the remote end of each clamping board 70, or to support a medial part of each of said boards as indicated at the right hand side of FIG. 25. Screws 44 extend through throughbores 32 formed in bench top 12, engage their associated captive nuts, and are tightened in the usual fashion by rotation of clamping tools 46. Note that each brace board 91 should have the same thickness as the stock 93 being worked.

A template 80 having a cut out 77 formed therein is shown in use in FIG. 27. A work stock 97 is positioned in sandwiched relation between said template and the bench top and clamping tools 46 are employed to tighten the template to thereby tightly secure the work stock against movement during the cutting operation that results in a groove being cut in stock 97 that has the configuration of opening 77.

FIGS. 28 and 29 depict a configuration of the novel bench where it supports a drafting board 82 having paper stop 84 and a box 86 for holding instruction sheets or drafting paper. Drafting board 82 and holder 86 are both held by clamping boards 70 and eyebolts 42 in the manner depicted.

Figure 31:
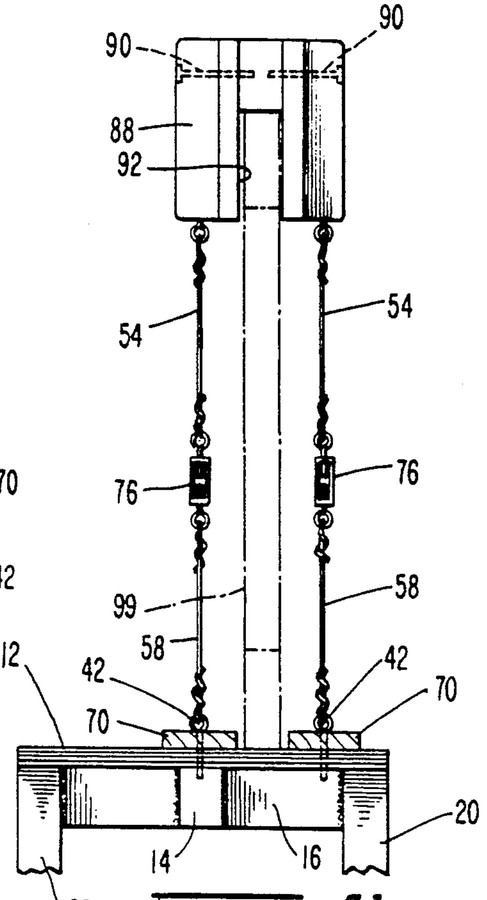
FIG. 31 is an end elevational view of the structure shown in FIG. 30.

A large work stock such as a door 99 may be worked while held on its edge in the manner shown in FIGS. 30 and 31. A plurality of mounting blocks 88, each of which has a door-edge-receiving channel 92 formed therein, are positioned along a longitudinal edge of the door 99, preferably in equidistantly spaced relation to one another as depicted in FIG. 30. Strap members 54 and 58, similar to those used in holding down the large item such as stool 53 as depicted in FIG. 26, and turnbuckles 56 are employed to connect the opposite ends of each mounting block 88 to clamping boards 70. Boards 70 are positioned on opposite sides of the door 99 as shown and are clamped to bench top 12 by suitable eyebolts 42 which are engaged by straps 58 as shown. The upper edge of the door is received within each channel 92 defined by the mounting blocks as best understood in connection with FIG. 31. Each mounting block could be made of a single piece, but the illustrated blocks are formed by bolting together multiple boards with bolts 90 (FIG. 31). It will be observed in FIG. 31 that eyebolts 42 extend below the plane of bench top 12; suitable recesses are formed in boards 14 and 16 which support the bench top from below, as mentioned earlier, to accommodate the eyebolts. It should also be pointed out, for emphasis, that each eyebolt is screw threadedly engaged by a captive nut 68; said captive nuts are not shown in FIG. 31 to simplify it but, again, every throughbore 32 formed in bench top 12 has a captive nut 68 of one type or another at the lowermost end of each throughbore.

Figure 32:
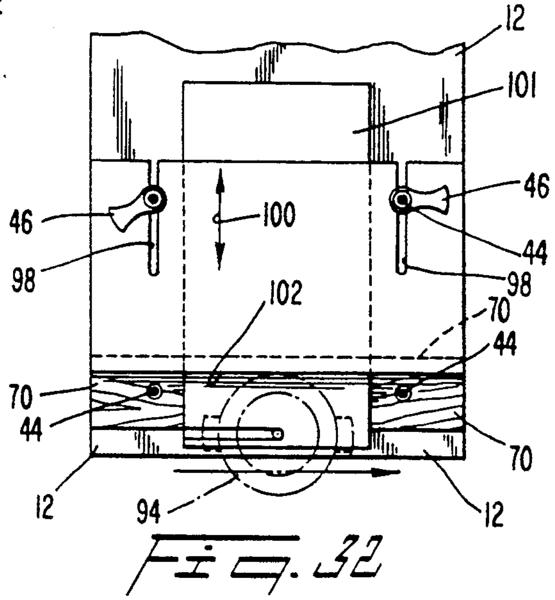
FIG. 32 is a top plan view of a structure for guiding a router.
Figure 33:
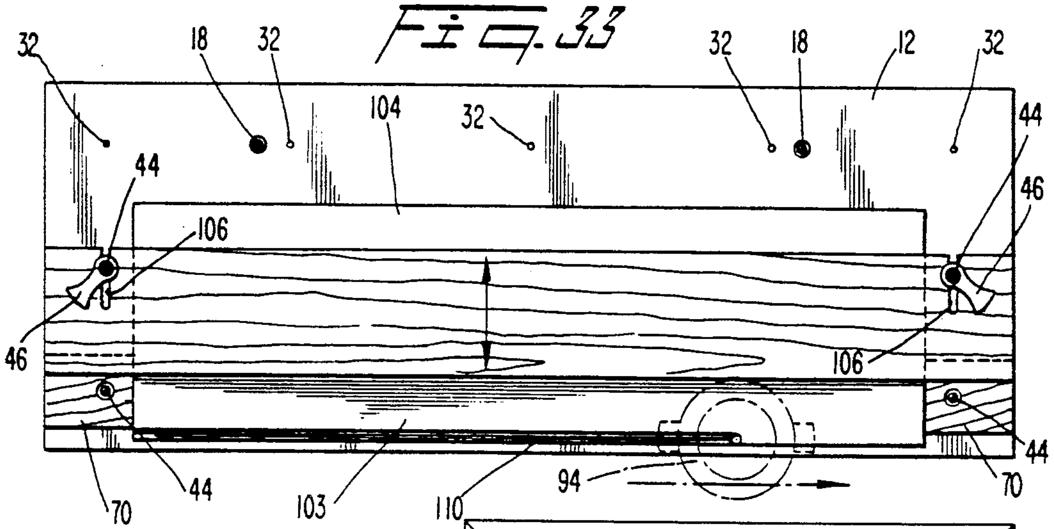
FIG. 33 is a top plan view of another structure for guiding a router.

A router may be employed to make narrow or wide rabbet or dado cuts along the length of work stock when the auxiliary parts of FIGS. 32 and 33 are employed in conjunction with the bench. A flat, adjustable stock clamp and router guide 96 (FIG. 32) having slots 98 formed in its trailing edge is placed in overlying relation as shown to the stock 101 to be worked with a router 94. Clamping tools 46, when loosened, enable adjustment of the clamp and router guide 96 as indicated by double-headed directional arrow 100 and, when tightened, hold the workpiece 101 in tightly sandwiched relation between said guide 96 and the bench top 12. Clamping boards 70 having the same thickness as stock 10 are positioned on opposite sides of the leading end of said stock 101 as shown, to keep the router from tilting at the start and finish of a cut. The leading edge 102 of the clamp and router guide 96 guides the router, i.e., the user of the router simply slides it as indicated by the single-headed directional arrow at the bottom of FIG. 32 while pushing the router against said leading edge 102.

An almost identical configuration of the novel apparatus as depicted in FIG. 32 is depicted in FIG. 33. Workpiece 103 is held in tightly sandwiched relation between clamp and router guide 104; guide 104 has leading edge 108 which performs the guidance function when the router 94 is displaced by its user along the path of travel indicated by the single-headed directional arrow in that FIG. Slots 106 enable adjustment of said guide 104 as indicated by the double-headed directional arrow so that cuts from narrow to wide may be made. The reference numeral 110 indicates the rabbet cut being made by router 94.

Note by comparing FIGS. 32 and 33 that the former figure shows a routing operation performed on a narrow workpiece at an end of the bench 10 whereas the latter figure shows a routing operation performed on a wide workpiece along the front of the bench. Thus, the versatility of the novel bench is established.

Although numerous additional configurations could be shown and described, it would unduly lengthen this disclosure to depict all of the configurations that have been invented and used by the present inventor.

Figure 34:
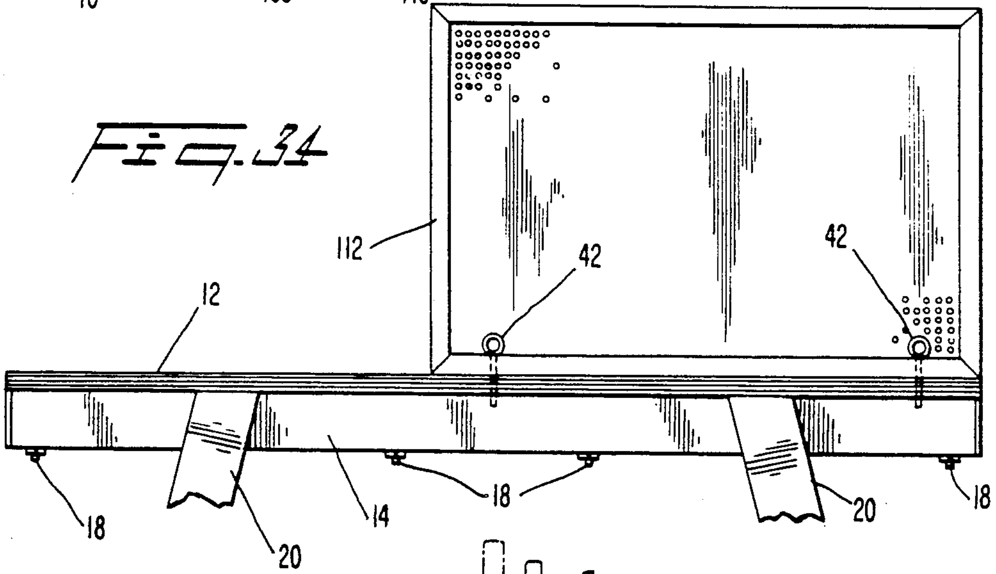
FIG. 34 is a partial front elevational view of the table when configured to hold a peg board.
Figure 35:
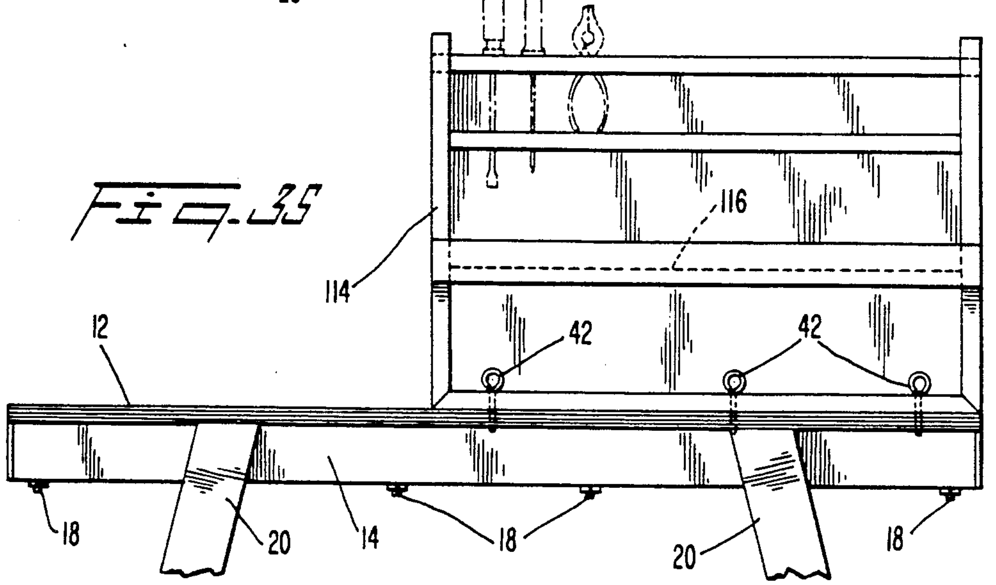
FIG. 35 is a partial front elevational view of the table when configured to hold a tool rack.

Accordingly, only four more configurations will be briefly mentioned. FIG. 34 shows how a peg board 112 for holding brackets of the type from which tools may be hung may be easily attached to the bench top 12 in upstanding relation thereto, and FIG. 35 shows a similar mounting of a different type of tool-holding apparatus 114 having shelf 116.

Figure 36:
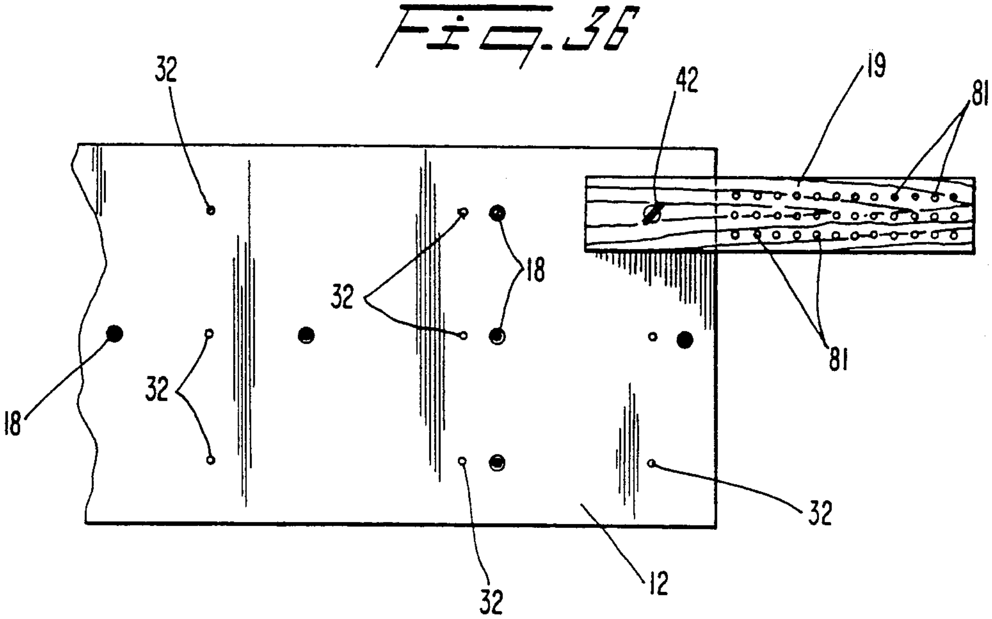
FIG. 36 is a top plan view of a novel holder for drill bits.

FIG. 36 shows how a drill bit holder may be mounted to the bench top. A board 79 having plural throughbores 81 drilled therethrough is held in cantilevered relation to an edge of bench top 12 by a suitable fastening means such as the screw 78 shown in FIG. 19 or the eyebolt 42 shown in FIG. 36. The selected fastening means extends through a throughbore formed in board 79 and through bench top throughbore 32 and its captive nut 68 so that tightening of the fastening means securely fastens the cantilevered board to the bench top. Drill bits may then be deposited in the throughbores 81 and suspended from board 79.

Figure 37:
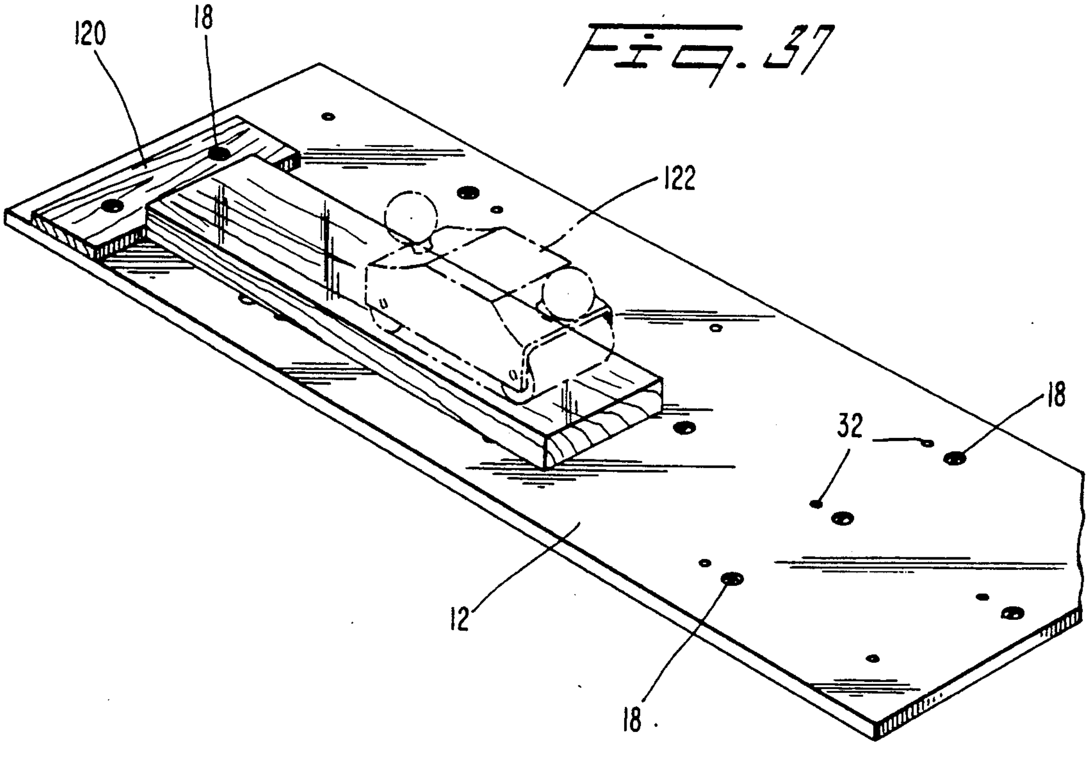
FIG. 37 is a perspective view of a belt sander showing use of a reduced thickness stop board.

Finally, reduced thickness stop boards 120 can be quickly attached with only one or two clamping tools, for planing, chiseling, or belt sanding, at any part of the bench top, as depicted in FIG. 37. Item 122 in that figure is a belt sander.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A work bench, comprising:

a flat bench top having a top surface and a bottom surface;

a plurality of bench top throughbores formed in said bench top;

each of said bench top throughbores having a countersink formed in said bottom surfaces;

a bench top captive nut being positioned within each of said countersinks and being held against rotation thereby;

at least one elongate clamping board having a plurality of clamping board throughbores formed therein along its extent;

each of said clamping board throughbores having a countersink formed in a top and bottom surface of its associated clamping board;

a captive screw disposed in at least one of said clamping board throughbore countersinks;

at least a pair of elongate screw members for screw threadedly engaging preselected throughbores of a preselected clamping board and preselected throughbores formed in said bench top that are in alignment with said clamping board throughbores;

whereby a workpiece sandwiched between a preselected clamping board and said top surface of said bench top may be clampingly engaged and held against movement when said screw members are advanced.

2. The work bench of claim 1, further comprising a clamping tool associated with each of said screw members, each of said screw members being disposed normal to its associated clamping tool and each of said screw members being fixedly secured to its associated clamping tool for conjoint rotation therewith.

3. The work bench of claim 2, wherein each of said clamping tools is specifically contoured for gripping by a human hand to facilitate advancement and retraction of its associated screw member.

4. The work bench of claim 3, further comprising a vise that is releasably attachable to said work bench, said vise having a mounting plate having throughbores formed therein, said mounting plate throughbores being alignable with said bench top throughbores, and said mounting plate being secured to said bench top by preselected screw members that extend through said mounting plate throughbores and said bench top throughbores, a base plate disposed orthogonally with respect to said mounting plate and being fixedly secured to an edge of said mounting plate, a clamping plate disposed in parallel relation to said base plate, a pair of base plate throughbores and clamping plate throughbores being formed in opposite ends of said base plate and said clamping plate, respectively, and a pair of elongate screws being disposed in screw threaded engagement with said base plate and clamping plate throughbores, whereby rotation of said elongate screws effects travel of said clamping plate toward and away from said base plate, depending upon the direction of rotation.

5. The work bench of claim 1, further comprising at least one clamping wedge to facilitate holding first and second workpieces together in edge-to-edge relation to one another atop said bench top, said at least one clamping wedge including a flat wedge base, a throughbore formed in said wedge base, a countersink being formed in said wedge base throughbore adjacent a bottom surface of said wedge base, a captive nut positioned in said wedge base countersink, a screw disposed through said wedge base throughbore and in screw threaded engagement with said captive nut, and a clamping tool that fixedly engages said screw near a head of said screw so that rotation of said clamping tool effects conjoint rotation of said screw and tightening of said clamping tool with respect to said wedge base, whereby rotation of said wedge base in a direction that causes it to bear against said first workpiece, followed by rotation of said clamping tool to advance said screw holds said wedge base against said first workpiece, and means for holding said second workpiece against lateral displacement with respect to said bench top.

6. The work bench of claim 1, further comprising a pair of turnbuckles and associated straps for interconnecting said clamping board and said bench top, a pair of eye hooks being screw threadedly engaged in associated clamping board throughbores, a pair of cooperatively aligned eye hooks being engaged in associated bench top throughbores, and said straps extending between associated turnbuckles and associated eye hooks, whereby a workpiece positioned atop said bench top is sandwiched between said bench top and said clamping board and whereby rotating said turnbuckles in a preselected direction effects shortening of the distance between said clamping board and said bench top and hence increases a clamping action exerted against said workpiece.

7. The work bench of claim 6, further comprising a strip of fabric fixedly secured to an underside of said clamping board to prevent marring of said workpiece.

8. The work bench of claim 1, further comprising a template having at least one cut out formed therein, said template having plural throughbores formed therein that are alignable with said bench top throughbores, and further including plural clamping tools for clamping a workpiece positioned in sandwiched relation between said template and said bench top, each of said clamping tools including an elongate screw fixedly secured to its associated clamping tool for conjoint rotation therewith and each of said elongate screws extending through said template throughbores and said bench top throughbores.

9. The work bench of claim 1, further comprising means for holding on its edge a flat workpiece such as a door, said means including a mounting block, an edge-receiving channel formed in said mounting block, and a plurality of turnbuckles and associated straps for interconnecting opposite sides of said mounting block to said bench top.

10. The work bench of claim 9, further comprising a pair of clamping boards positioned in overlying relation to said bench top on opposite sides of said workpiece, said clamping boards being secured to said bench top by eye hooks and said eye hooks being interconnected to said turnbuckles by preselected straps.

11. The work bench of claim 1, further comprising a stock clamp and router guide, said stock clamp and router guide being flat and having a leading edge against which a router may slide, and a pair of clamping tools for clamping said router guide in overlying relation to said bench top so that a workpiece disposed in sandwiched relation between said bench top and said router guide is held against movement when said clamping tools are advanced so that a router may be guided along said workpiece by said router guide leading edge.

12. The work bench of claim 1, further comprising an adjustable router guide, said router guide being flat and having a leading edge against which a router may slide, said router guide having a pair of parallel slots formed therein along a trailing edge thereof, and further comprising a pair of clamping tools, each of which is associated with one of said slots and each of which includes a handle and an elongate screw that is positioned normal to its associated handle and which is fixedly secured to its handle for conjoint rotation therewith so that a workpiece to be routed is positionable in sandwiched relation between said router guide and said bench top, said clamping tools are employed to advance said router guide toward said bench top, thereby sandwiching said workpiece between said router guide and said bench top, so that a router may be guided along said workpiece by said router guide leading-edge.

13. The workbench of claim 1, further comprising means for quickly installing or removing stop boards for bench top planing, chiseling, and belt sanding operations.

14. The workbench of claim 1, further comprising means for clamping a piece of stock to the bench top for freehand routing in the absence of obstructions to arm movement.

* * * * *